United States Patent [19]

Takatsugi et al.

[11] Patent Number: 5,344,303
[45] Date of Patent: Sep. 6, 1994

[54] SCREW LINKAGE STRUCTURE FOR USE IN AN INJECTION MOLDING MACHINE

[75] Inventors: Satoshi Takatsugi; Susumu Ito, both of Yamanashi, Japan

[73] Assignee: Fanuc Ltd., Yamanashi, Japan

[21] Appl. No.: 75,474

[22] PCT Filed: Oct. 20, 1992

[86] PCT No.: PCT/JP92/01361

§ 371 Date: Jun. 16, 1993

§ 102(e) Date: Jun. 16, 1993

[87] PCT Pub. No.: WO93/08010

PCT Pub. Date: Apr. 29, 1993

[30] Foreign Application Priority Data

Oct. 21, 1991 [JP] Japan ................... 3-299509

[51] Int. Cl.⁵ ............................................. B29C 45/17
[52] U.S. Cl. ................................ 425/190; 425/192 R
[58] Field of Search ............. 425/185, 190, 192 R

[56] References Cited

FOREIGN PATENT DOCUMENTS

| 0266709 | 5/1988 | European Pat. Off. . |
| 9205279 | 6/1992 | Fed. Rep. of Germany . |
| 2553841 | 4/1985 | France . |
| 63-134214 | 6/1988 | Japan . |
| 63-34896 | 9/1988 | Japan . |
| 63-45292 | 11/1988 | Japan . |
| 3-213321 | 9/1991 | Japan . |
| 9002634 | 6/1992 | Netherlands . |

*Primary Examiner*—Tim Heitbrink
*Attorney, Agent, or Firm*—Staas & Halsey

[57] ABSTRACT

A screw linkage structure in an injection molding machine comprises a screw (8) having at its base a spline portion (11), a spline bush (9) for receiving the spline portion (11), a screw sleeve (4) having a front surface to which the spline bush (9) is secured, and a retainer (10) serving to prevent the screw (8) from being disengaged from the spline bush (9). The spline portion (11) formed on the screw base is fitted into the spline bush (9) and includes an annular groove (15). The spline bush (9) has a through-hole acting as a retainer attachment hole (16) at the position corresponding to the annular groove (15) of the screw base to be fitted thereinto. The retainer (10) is then inserted into the retainer attachment hole (16) of the spline bush (9) until its leading edge reach the annular groove (15) of the screw base, thereby preventing the screw (8) from being disengaged from the screw sleeve (4).

4 Claims, 4 Drawing Sheets

SCREW LINKAGE STRUCTURE FOR USE IN AN INJECTION MOLDING MACHINE

DESCRIPTION

1. Technical Field

The present invention relates to a structure for linking a screw, in an injection molding machine, with a sleeve, transmitting an axial injection force and a rotational force, for measurement to the screw.

2. Background Art

An injection molding cycle in an injection molding machine comprises a clamping process for clamping a mold; an injection process for injecting a molding material (or a molten resin) into a cavity of the clamped mold; a dwell process for keeping the molding material filled into the mold cavity, at a predetermined pressure for a given period of time after injection of the molded material; an opening process for opening the mold to remove the molded product; and measurement and melting process for measuring and melting the molding material by applying heat and applying screw rotation.

During the injection process, a screw is driven toward a nozzle without rotating the screw. During the measurement process, the screw is forced to rotate out from the dwell position.

Use of the screw of the injection molding cycle creates a transmission of both axial and rotational forces. To this end, a conventional injection molding machine of in-line screw type (the melting and injection of the molding material are effected in a coaxial manner), includes a screw linkage structure as shown in FIG. 4.

The in-line screw injection molding machine depicted in FIG. 4 comprises a pusher plate 1 receiving a tie bar 2, of an injection section. The tie bar 2 is slidably displaceable to-and-fro. The pusher plate 1 includes at its center a housing 3 secured thereto, and at its front a screw sleeve 4 (hereinafter referred to simply as a sleeve 4). The sleeve 4 is supported by a bearing 5, so as to be rotatable with respect to the housing 3. On the rear side of the pusher plate 1 there is arranged an injection mechanism 6 whose fore-end is supported on the pusher plate 1. The sleeve 4 is provided with a pulley 7, rotationally driven by a servo-motor for measurement (not shown). A screw 8 is loaded onto the front surface of the sleeve 4 with the aid of a linkage structure. The linkage structures includes a spline bush 9 and a retainer 10, to transfer movement in the axial direction, (or to-and-fro direction) arising from the injection mechanism 6, and to transfer rotational movement caused by the servomotor, to the screw 8.

FIG. 5 depicts, in more detail, a structure for linking the screw 8 to the sleeve 4, which corresponds to the structure disclosed in Japanese Patent Laid-open Publication No. 1-115615. The structure includes a splined portion 11, formed on the rear end of the screw 8, fitted into a spline bush 9. The spline bush 9 is fitted into an insertion hole 12, provided in the front surface of the sleeve 4. The portion of the screw 8, immediately in front of the splined portion 11, is tapered into a small diameter portion 13 to define, at the fore-end of the splined portion 11, a shoulder. The shoulder is brought into contact with the rear surface of the retainer 10. The spline bush 9 and the retainer 10 are externally fastened to the sleeve 4 using common bolts 14. This allows the base of the screw 8 can be driven in both axial and rotational directions by the sleeve 4.

Inconveniently, this structure involves a drawback that the small diameter portion 13, which must be arranged immediately in front of the splined portion 11 for attachment of the retainer 10 to the screw 8, presents less strength against torsion or bending moment applied thereto, when the screw 8 is rotated by the sleeve 4. Furthermore, the shoulder at the foreend of the splined portion 11 serves substantially as a fore-end surface of spline teeth which is allowed to abut against the rear surface of the retainer 10. Due to its smaller contact area, however, a plastic deformation may arise in the spline teeth or the retainer 10. In addition, the retainer 10 requires a diameter large enough to cover the spline bush 9 for attachment to the sleeve 4.

In another conventional structure for linking the screw 8 with the sleeve 4, as shown in FIG. 6, the splined portion 11 formed on the base (or the rear end) of the screw 8 is provided with an annular groove 15 to which the retainer 10 halves are mounted from both sides with respect to the axial direction. The splined portion 11 is then fitted into the spline bush 9 which is firmly fixed to the sleeve 4 using the bolts 14. This thereby, establishes a linkage of the screw 8 with the sleeve 4.

The structure depicted in FIG. 6 presents the advantages that the small diameter portion created by the annular groove 15 is not subjected to torsion or bending moment and thus, is free from the impairment in strength of the screw 8, which may overcome the above drawbacks, and that the retainer 10 is small in size and not permitted to come off upon loading into the sleeve 4 irrespective of counterparts, since the retainer 10 is firmly attached to the spline bush 9. In this structure, however, the spline bush 9 presses against the retainer 10, and accordingly the spline bush 9 must be removed after unscrewing the bolts 14 in order to unload the screw 8. This may result in laborious work in a narrow operating space.

Nevertheless, the screw 8 of the injection molding machine must be unloaded or changed at the time of resin replacement or inner cleaning, or possibly, replaced with a new one as an expendable supplies. In the case of molding using a resin where hard particles, such as a glass fiber, are mixed in particular, the screw may undergo extreme wear and need a further replacement after short period of time. Thus, it is desirable for the linkage structure between the screw 8 and the sleeve 4 not only to have a sufficient strength, but also to have ease of loading and unloading the screw.

DISCLOSURE OF THE INVENTION

Therefore the object of the present invention is to provide a screw linkage structure in an injection molding machine, capable of easily loading and unloading the screw, without using any tool, and free from impairment in strength of the screw base.

To accomplish the above object, the screw linkage structure in an injection molding machine according to the present invention comprises a screw having at its base a spline portion; a spline bush receiving the spline portion of the screw; a screw sleeve having a front surface to which the spline bush is fixed; a retainer serving to prevent the screw from being disengaged from the spline bush; the spline portion formed on the screw base including an annular groove, the spline bush including a through-hole at the position corresponding to the annular groove of the screw base to be fitted thereto, the retainer being inserted into the through-hole of the spline bush until its leading edge reaches the annular groove of the screw base; and a fastener for fastening the retainer whose leading edge is engaged with the annular groove to the side of the screw sleeve.

Preferably, the through-hole provided in the spline bush comprises a couple of through-holes each confronting the other with respect to the axis of the screw, and correspondingly, the retainer also comprises a couple of retainers.

Preferably, the retainer is fashioned into an elongated plate and has at its one edge a notch configured to correspond to the annular groove of the screw base.

Additionally, the fastener means to be attached to the retainer preferably comprises a plunger, a pin, and a spring for biasing the pin toward the direction in which the pin protrudes from the plunger; and the screw sleeve includes at its front surface an engagement hole for receiving the pin at the position corresponding to that of the pin, under the condition that the leading edge of the retainer has reached the annular groove of the screw base.

According to the present invention as described above, the provision of the retainer attachment hole radially extending through from the outer surface of the sleeve, including the spline bush, up to the splined hole of the spline bush enables the retainer to be attached to and detached from the screw base without removing the spline bush. This thereby ensures a simple loading and unloading of the screw without using any tool. The annular groove and its vicinity are not subjected to a torsion or bending force which may impair the strength of the screw.

BEST MODE FOR CARRYING OUT THE INVENTION

Figure 1:
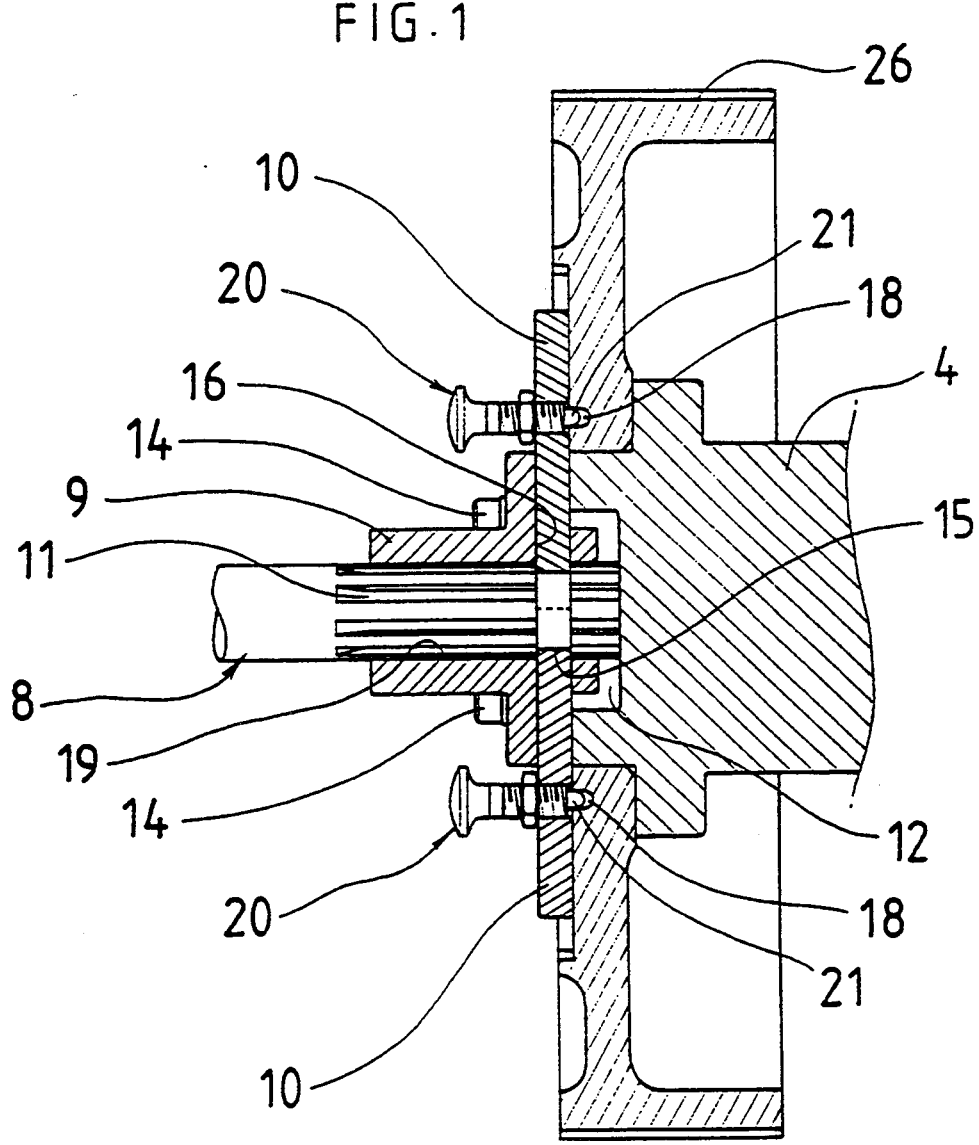
FIG. 1 is a partially sectional view showing an embodiment of the present invention.
Figure 2:
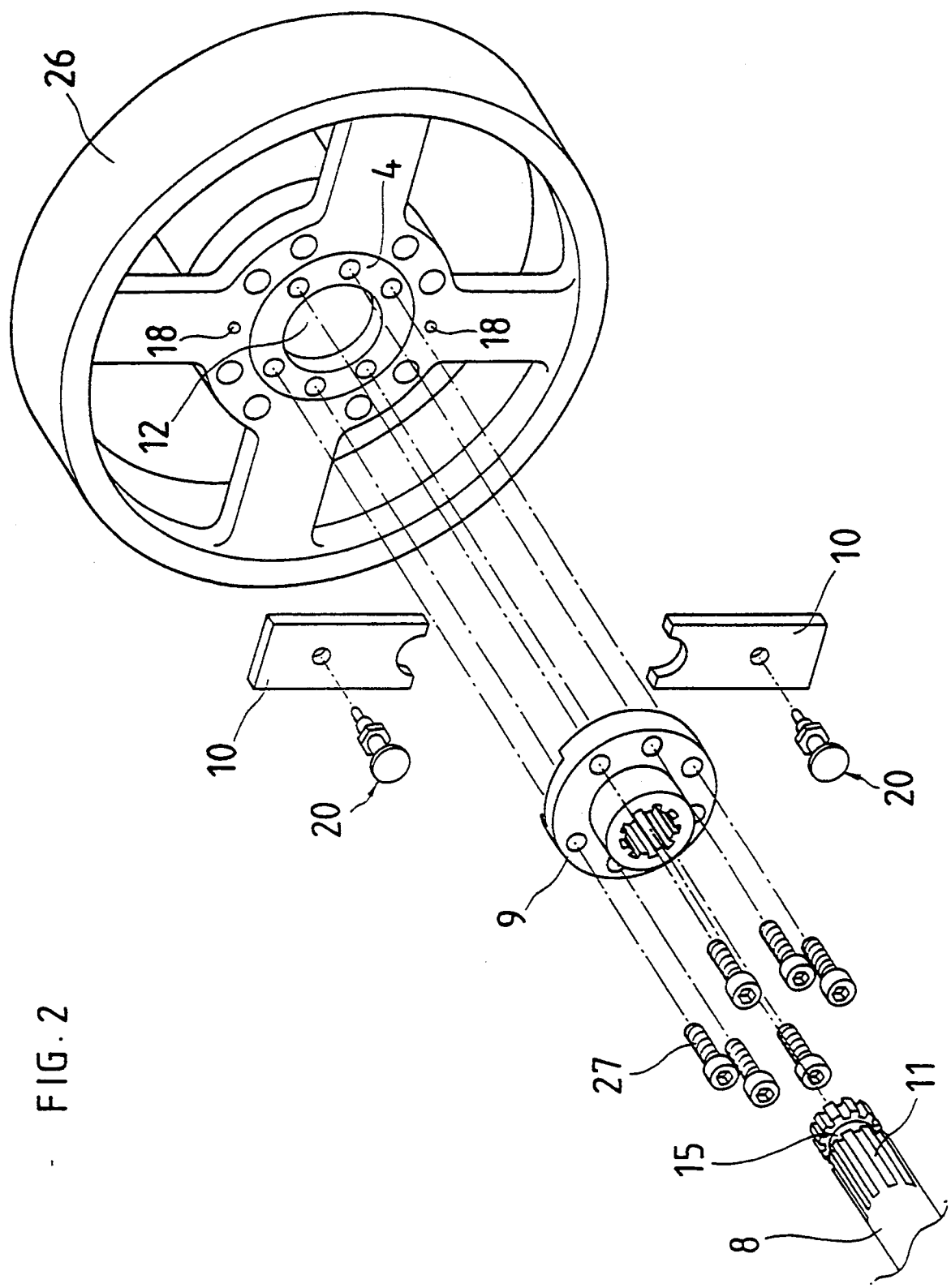
FIG. 2 is an perspective view also showing the embodiment of the present invention.
Figure 4:
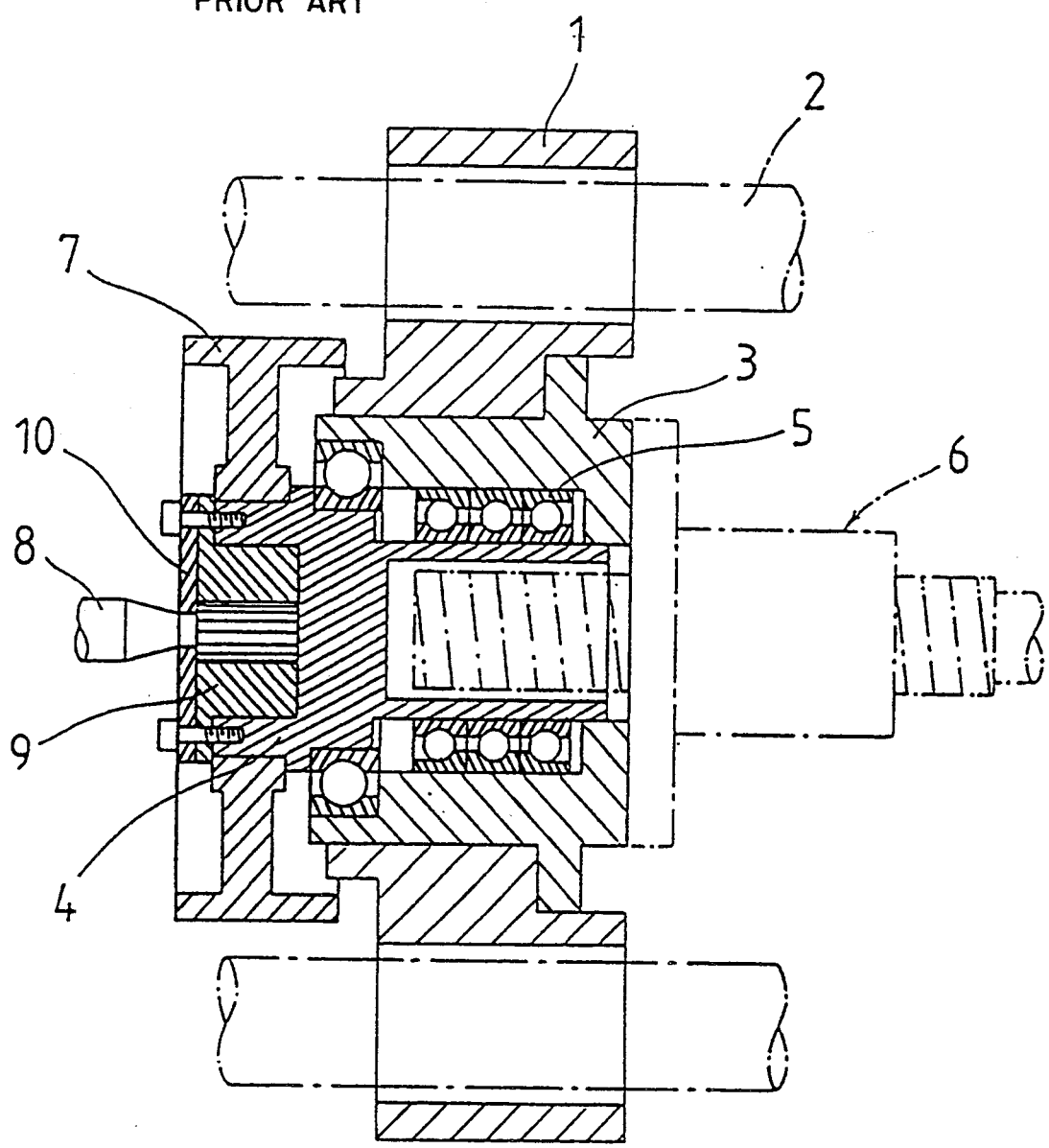
FIG. 4 is a partially sectional view showing a conventional example.
Figure 5:
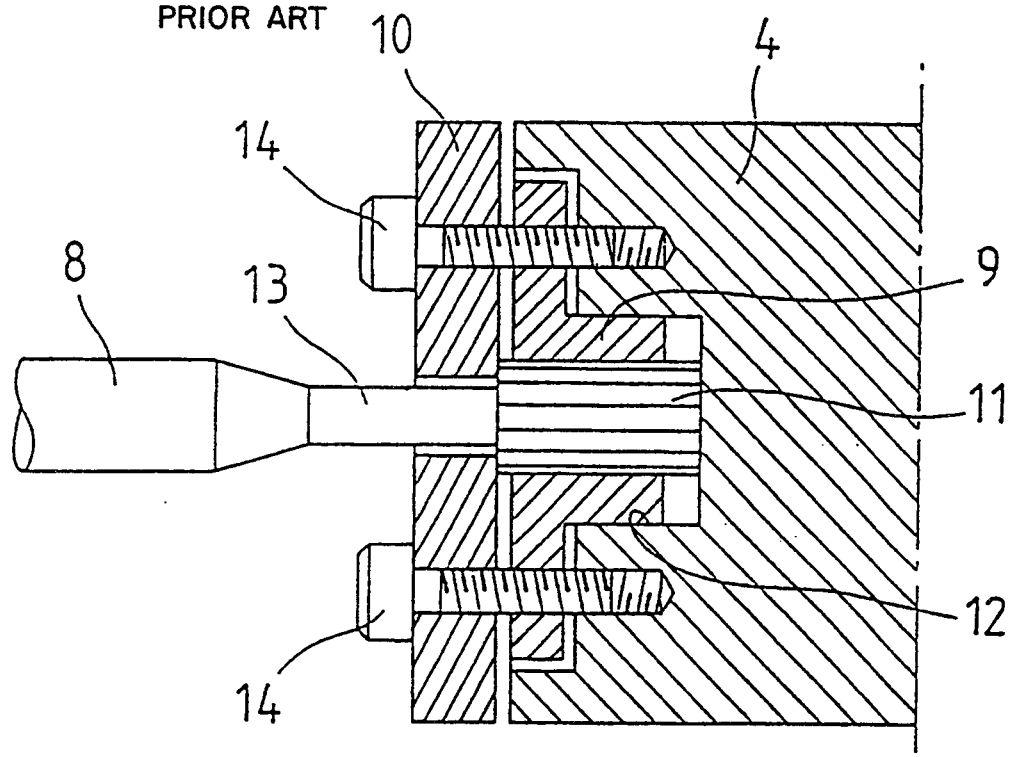
FIG. 5 is a partially enlarged view of the partially sectional view in FIG. 4.
Figure 6:
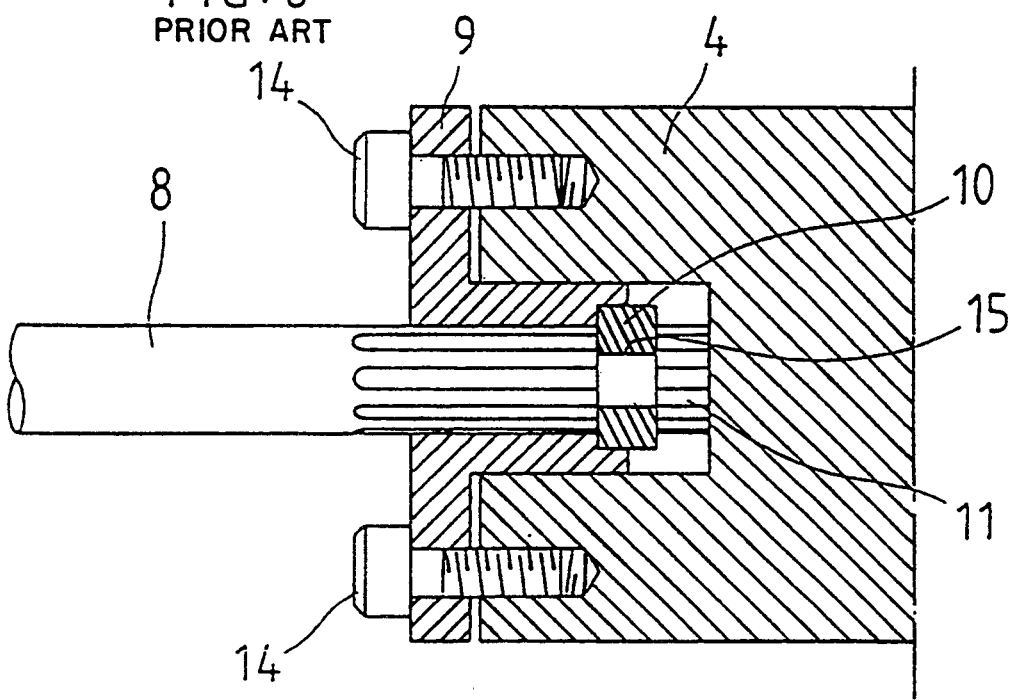
FIG. 6 is a partially enlarged view showing another conventional example in place of the partially enlarged view in FIG. 5.

FIGS. 1 and 2 depict, in a partially sectional view and perspective view, respectively, a screw linkage structure of the present invention by way of example, serving to link a screw 8 with a screw sleeve (hereinafter referred to simply as a sleeve) 4 which drives the screw 8 in both axial and rotational directions and having a spline bush 9 and a pair of retainers 10 described in detail later.

The screw 8 has a base to be linked with the sleeve 4 and provided with a spline. The splined portion 11 is formed with an annular groove 15.

On the contrary, the sleeve 4 is provided with a pulley 26 and has, at its front surface, an insertion hole 12 for receiving a part of the spline bush 9 and the base of the screw 8.

The spline bush 9 has, at its center, a spline to be mated with the splined portion 11 of the screw 8. The spline bush 9 further includes a radially extending through-hole for receiving the pair of retainers 10 described later, that is, a retainer attachment hole 16.

As shown in FIG. 2, the retainer 10 is comprised of an elongated plate whose one end is semi-circularly notched to fit the outer periphery of the annular groove 15 of the screw 8.

The spline bush 9 is fixedly secured to the front surface of the sleeve 4 by six bolts 27. Under the condition where the spline bush 9 is fastened to the sleeve 4, as shown in FIG. 1, the splined portion 11 of the screw 8 is engaged with the spline bush 9 to prohibit their relative rotations. As is apparent from FIG. 1, the extremity of the screw 8 fitted into the spline bush 9 is further introduced into the insertion hole 12 provided in the front surface of the sleeve 4 in such that the annular groove 15 of the screw 8 confronts the retainer attachment hole 16 of the spline bush 9. Under such conditions, therefore, the notched edge of the retainer 10 is allowed to freely reach the annular groove 15 of the screw 8 through the retainer attachment hole 16, as shown in FIG. 1.

Figure 3:
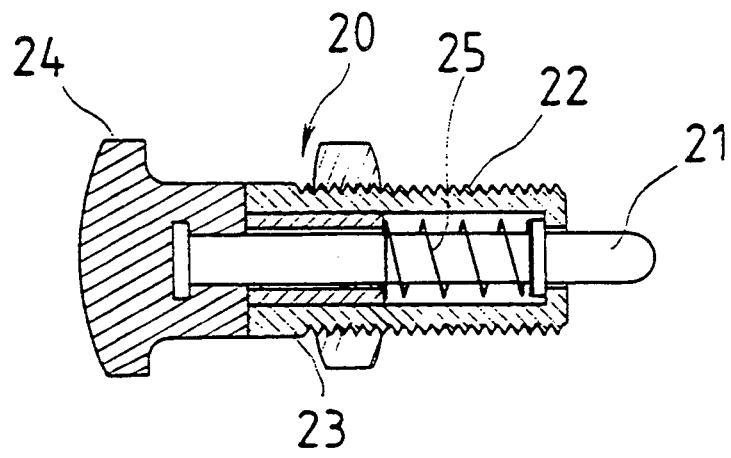
FIG. 3 is a partially enlarged view of the partially sectional view in FIG. 1.

A couple of plungers 20, illustrated schematically and in enlarged view in FIGS. 2 and 3, respectively, restrain the radial movement of the retainer 10 through the retainer attachment hole 16 in the spline bush 9, to hold the edge of the retainer 10 when fitted into the annular groove 15 of the screw 8. The couple of plungers 20 are attached to the retainer 10 at the points not blocked by the spline bush 9 by screwing, for example.

As shown in FIG. 3, the plunger 20 comprises a tubular body 23, having on its outer periphery a threaded portion 22, a pin 21 with a finger grip 24 fitted into the body 23; and a spring 25 housed in the body 23 to bias the pin 21 toward the direction the tip of the pin 21 projects. The threaded portion 22 on the outer periphery of the structured plunger 20 is adapted to engage with a couple of threaded holes provided on the retainer 10. The pin 21 can be retracted within the interior of the body 23 by pulling the plunger 20 by the finger grip 24 against the biasing force of the spring 25. A couple of holes for receiving the pin 21 of the plunger 20, namely, pin engagement holes 18 are provided on the side of the sleeve 4. In this embodiment, the pin engagement holes 18 are formed in the pulley 26 secured to the sleeve 4.

When the finger grip 24 of the plunger 20 is released under the condition where the semi-circularly notched edge of the retainer 10 is fitted into the annular groove 15 of the screw 8 through the retainer attachment hole 16, the pin 21 of the plunger 20 is permitted to project, from the plunger body 23 by the resilience of the spring 25 to be engaged with the pin engagement holes 18 on the sleeve side (pulley 26). Under such condition, the retainer 10 is restrained from displacing in the radial direction of the spline bush 9 so as to maintain the state of the retainer 10 whose notched edge is being fitted into the annular groove 15 of the screw 8. As a result, the screw 8 is prevented from being disengaged from the spline bush 9 by virtue of the retainer 10.

The structure for the linkage of the screw 8 with the sleeve 4, as described above, ensures a secure transmission of not only a rotational movement of the pulley 26 to the screw 8 by way of the spline bush 9, but also an axial movement of the sleeve 4 to the screw 8.

In order to remove the screw 8 from the sleeve 4 side, the retainer 10 may be moved radially outwardly with respect to the axis of the screw 8 (or in the direction away from the axis) while pulling the plunger 20 by the finger grip 24. In other words, provided that the pin 21 is disengaged from the pin engagement hole 18 by pulling the finger grip 24 against the resilience of the spring 25, then the retainer 10 can be freely displaced in the radial direction of the axis of the screw 8. Hence, the retainer 10 is outwardly displaced until the notched edges thereof are disengaged from the annular groove 15.

After the screw 8 has been removed from the sleeve 4 side in this manner, another screw 8 may be linked with the sleeve 4 side for replacement. In this case, the splined portion 11 of the screw 8 is fitted into the spline bush 9 in such a manner that the annular groove 15 of the screw 8 confronts the retainer attachment hole 16 of the spline bush 9. Then the retainer 10 is inwardly moved in the radial direction with respect to the axis of the screw 8 (that is, in the direction coming closer to the axis) until the notched edges thereof are brought into engagement with the annular groove 15 of the screw 8. The finger grip 24 of the plunger 20 is then released to allow the pin 21 to engage with the pin engagement hole 18.

It is to be appreciated that the positional relationship between the annular groove 15 of the screw 8 and the retainer attachment hole 16 of the spline bush 9 is such that the annular groove 15 of the screw 8 just coincides with the retainer attachment hole 16 of the spline bush 9 when the screw 8 is inserted into the spline bush 9 until its end surface is abutted against the bottom of the insertion hole 12 of the sleeve 4, as shown in FIGS. 1 and 2.

In either case of attachment or detachment of the screw 8 as discussed hereinabove, there is no need for the removal of the spline bush 9 serving to hold the retainer 10. Thus, the screw 8 is able to be easily attached or detached without any difficult work such as, for example, use of tools at the point around which the mechanism is complicated.

The above is merely an embodiment of the present invention, and hence the plunger 20 may be replaced by other anti-disengagement means such as a hook easy to attach and detach. Further, in this embodiment, the pair of retainers 10 are introduced into the retainer attachment hole 16 from both sides toward the axis of the screw 8, but alternatively, a single integral retainer 10 may be inserted thereinto from only one side.

What is claimed is:

1. A screw linkage structure in an injection molding machine, comprising:
    a screw having at its base a spline portion;
    a spline bush receiving said spline portion of said screw;
    a screw sleeve having a front surface to which said spline bush is fixed and at least one side; and
    a retainer serving to prevent said screw from being disengaged from said spline bush, said retainer having a leading edge; wherein
    said spline portion formed on said screw based includes an annular groove,
    said spline bush includes a through-hole at a position corresponding to said annular groove of said screw base,
    said retainer is inserted into said through-hole of said spline bush until the leading edge of said retainer reaches said annular groove of said screw base,
    said retainer is provided with a fastener means for fastening said retainer, whose leading edge is engaged with said annular groove, to one of the at least one side of said screw sleeve,
    said fastener means attached to said retainer comprises a plunger, a pin, and a spring for biasing said pin toward the direction in which said pin protrudes from said plunger, and
    said screw sleeve includes at the front surface, an engagement holder for receiving said pin at a position corresponding to that when the leading edge of said retainer has reached said annular groove of said screw base.

2. A screw linkage structure in an injection molding machine, according to claim 1, wherein
    said through-hole provided in said spline bush comprises a plurality of through-holes, each confronting the other with respect to the axis of said screw, and said retainer also comprises a plurality of retainers.

3. A screw linkage structure in an injection molding machine according to claim 1, wherein
    said retainer is an elongated plate, said elongated plate having at one edge, a notch corresponding to said annular groove of said screw base.

4. A screw linkage structure in an injection molding machine according to claim 2, wherein
    said retainer is an elongated plate, said elongated plate having at one edge, a notch corresponding to said annular groove of said screw base.

* * * * *

UNITED STATES PATENT AND TRADEMARK OFFICE
CERTIFICATE OF CORRECTION

PATENT NO. :   5,344,303
DATED      :   September 6, 1994
INVENTOR(S):   Satoshi TAKATSUGI et al.

It is certified that error appears in the above-identified patent and that said Letters Patent is hereby corrected as shown below:

| | |
|---|---|
| Col. 1, line 28 | delete [use], insert --Thus use--; delete [of] (second occurrence) and insert --in--. |
| Col. 1, line 51 | insert --,-- after "movement". |
| Col. 1, line 67 | delete [can] and insert --to--. |
| Col. 2, line 7  | delete [foreend] and insert --fore-end--. |
| Col. 2, line 41 | delete [,] and insert --be--. |
| Col. 3, line 13 | delete [means]. |
| Col. 6, line 37 | after [and] insert --correspondingly,--. |

Signed and Sealed this

Twenty-ninth Day of November, 1994

Attest:

BRUCE LEHMAN

*Attesting Officer*    *Commissioner of Patents and Trademarks*